United States Patent [19]
Katooka et al.

[11] Patent Number: 5,757,638
[45] Date of Patent: May 26, 1998

[54] POWER SUPPLY APPARATUS

[75] Inventors: Masao Katooka, Kawanishi; Toru Arai, Shimochoja-machi; Shigeru Okamoto, Hirakata; Kenzo Danjo, Kyoto-fu; Masaharu Tanaka, Osaka, all of Japan

[73] Assignee: Sansha Electric Manufacturing Company, Limited, Osaka, Japan

[21] Appl. No.: 775,165

[22] Filed: Dec. 31, 1996

[51] Int. Cl.$^6$ .................................................. H02M 1/00
[52] U.S. Cl. ........................................................... 363/146
[58] Field of Search ............................ 363/146; 361/346, 361/358, 381, 391, 397, 399

[56] References Cited

U.S. PATENT DOCUMENTS

| Re. 35,190 | 3/1996 | Zylstra et al. | 363/146 |
|---|---|---|---|
| 4,039,900 | 8/1977 | Roback et al. | 361/388 |
| 4,742,430 | 5/1988 | Sawato et al. | 361/395 |
| 4,985,806 | 1/1991 | Mazzullo et al. | 361/392 |
| 5,563,782 | 10/1996 | Chen et al. | 363/146 |

FOREIGN PATENT DOCUMENTS

| 0420650A2 | 4/1991 | European Pat. Off. . |
|---|---|---|
| HEI 8-140349 | 5/1996 | Japan . |
| HEI8-236970 | 9/1996 | Japan . |
| HEI8-275549 | 10/1996 | Japan . |

OTHER PUBLICATIONS

Derwent Abstract Accession No. 94-187497/23, Class T01 and JP 6-125187, Hitachi Ltd., 1994.

*Primary Examiner*—Matthew V. Nguyen
*Attorney, Agent, or Firm*—Duane, Morris & Heckscher LLP

[57] ABSTRACT

A power supply apparatus comprises a housing having a panel. A power supply circuit is disposed in the housing. The power supply circuit supplies power to a load. A control circuit controls the operation of the power supply circuit in accordance with control information. The control circuit is formed on a printed circuit board mounted on the panel in the housing. The printed circuit board is provided with a control which can be operated from outside the housing. The control provides the control information in response to operation thereof from outside the panel.

3 Claims, 4 Drawing Sheets

POWER SUPPLY APPARATUS

This invention relates to power supply apparatus for, for example, a welder or a cutter.

BACKGROUND OF THE INVENTION

Power supply apparatus for a welder or cutter is disposed in a housing. The power supply apparatus converts AC power into DC power for application to the torch of the welder or cutter and a workpiece to be wrought. The power supply apparatus may include a first converter for converting AC power applied thereto from an AC power source into DC power. The DC power provided by the first converter is converted into high frequency power by an inverter. The high frequency power is then converted by a second converter into DC power, which is applied between the torch and the workpiece.

Before using a welder or cutter, a user sets variable resistors and switches on the power supply apparatus for conditions where the power supply apparatus of the welder or cutter is operated. Control information provided by the user by setting the variable resistors and the switches is fed to a control circuit in the power supply apparatus. The control circuit controls e.g. the inverter in accordance with the control information. The control circuit may be disposed on a control printed circuit board, which may be disposed in the housing.

The variable resistors and the switches are mounted directly on a panel forming a part of the housing, and connected by wiring to the control printed circuit board.

Because the variable resistors and the switches must be mounted on the panel and, in addition, connected by wiring to the control printed circuit board, the manufacturing of the welder or cutter takes a great deal of time and effort.

SUMMARY OF THE INVENTION

Power supply apparatus according to the present invention includes a housing having a panel. The housing houses power supply means therein. The power supply means provides DC power to a load. Operation of the power supply means is controlled by control means formed on a printed circuit board in accordance with control information. The printed circuit board is disposed in the housing and mounted on the panel. The printed circuit board is provided with a control which can be operated from outside the housing. The control provides the control information to the control means in response to operation thereof from outside the panel.

The panel may include a window through which the interior of the housing communicates with the exterior. The printed circuit board is attached to the inner surface of the panel to close the window. The control is mounted on the printed circuit board within the boundary of the window.

A decorative board may be attached to the outer surface of the panel to close the window. The control includes an operating member which passes through the decorative board and projects outward of the housing. The control is operated through the manipulation of the operating member.

DETAILED DESCRIPTION OF PREFERRED EMBODIMENT

Power supply apparatus according to the present invention is described as it is used, for example, with a welder.

Figure 1:
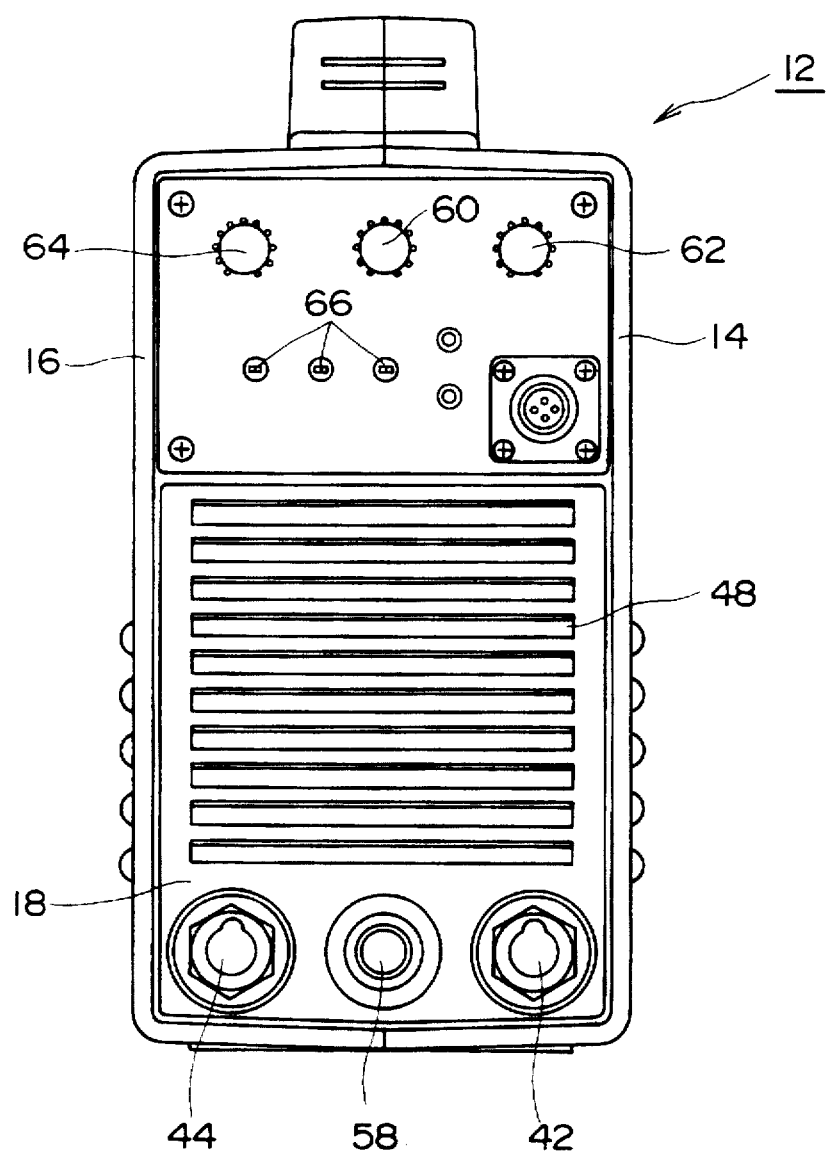
FIG. 1 is a front view of power supply apparatus for a welder according to the present invention.
Figure 2:
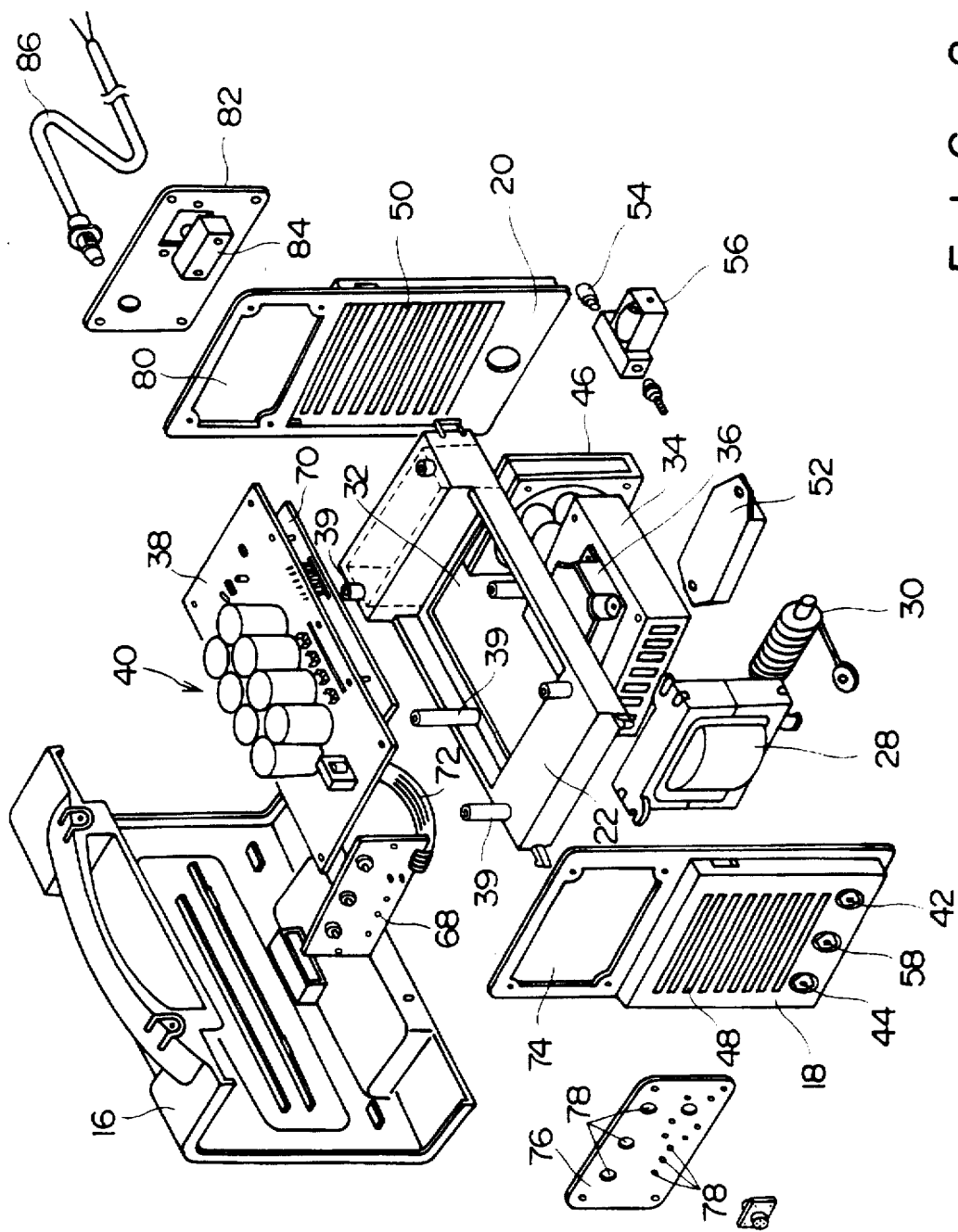
FIG. 2 is an exploded perspective view of the power supply apparatus of FIG. 1.

As shown in FIG. 1, power supply apparatus 10 of the present invention has a housing 12. The housing 12 includes a right-side panel 14 and a left-side panel 16 which have a generally U-shaped sectional configuration and which abut against each other along their open edges to thereby define a generally rectangular tubular structure having front and rear openings. A front panel 18 closes the front opening, and a rear panel 20 closes the rear opening, whereby a generally rectangular interior space is defined by the four panels 14, 16, 18, and 20, as shown in FIG. 2. It should be noted that in FIG. 2, the right-side panel 14 is not shown.

Figure 3:
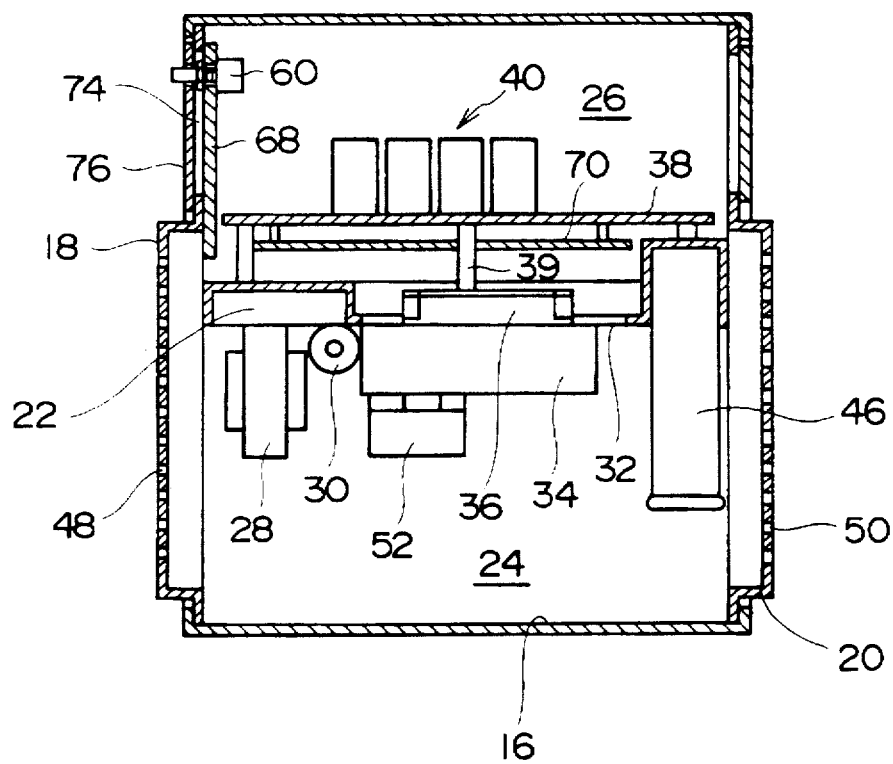
FIG. 3 is a cross-sectional view of the power supply apparatus of FIG. 1.

As shown in FIG. 3, the housing 12 contains therein a partition 22 having its two opposed edges connected to the front and rear panels 18 and 20 at an approximately half height of the panels. The partition 22 divides the interior space of the housing 12 into lower and upper chambers 24 and 26.

The lower chamber 24 contains a transformer 28 and a smoothing reactor 30 which are components of a power supply circuit. The transformer 28 is disposed nearer to the front panel 18 than the reactor 30. The partition 22 includes, in its center, an opening 32 through which the upper chamber 26 and the lower chamber 24 communicate with each other. Heat dissipating means or heat sink 34 is disposed in the lower chamber 24 and secured to the partition 22 to partly or entirely close the opening 32. On the top surface of the heat sink 34, a semiconductor module 36 is disposed which contains therein components, such as a plurality of diodes forming first and second rectifying circuits and a plurality of transistors forming a high frequency inverter.

In the upper chamber 26, a printed circuit board 38 is secured to the partition 22 by spacers 39, and smoothing capacitance 40 is mounted on the printed circuit board 38.

The power supply circuit may produce DC current from commercial AC current in a manner stated below. The first rectifying circuit rectifies commercial AC current, and the smoothing capacitance 40 smooths it to provide DC current. The DC current is then converted by the high frequency inverter into high frequency current. The high frequency current is applied through the transformer to the second rectifying circuit for rectification, and then smoothed by the smoothing reactor 30. In this manner, the desired DC current is produced.

As shown in FIG. 1, in a lower portion of the front panel 18, there are mounted two terminals 42 and 44 from which the smoothed current is applied to flow between the torch of the welder and a workpiece (not shown).

A fan 46 for cooling the transformer 28, the smoothing reactor 30, and the heat sink 34, is secured to the partition 22 at a location near the rear panel 20 in the lower chamber 24. The fan 46 draws air into the housing 12 through air-intake apertures 48 in the front panel 18. The rear panel 20 is provided with air-outlet apertures 50 for blowing air out of the housing 12 therethrough.

A high frequency voltage generator 52 may be used to initiate plasma arcing for arc welding. The high frequency voltage generator 52 is disposed below the heat sink 34.

As shown in FIG. 2, a gas inlet terminal 54 is disposed in a lower portion of the rear panel 20. The gas inlet terminal 54 receives a plasma arc generating gas to be supplied to the torch of the welder. The gas inlet terminal 54 is connected to a solenoid valve 56. The valve 56 is connected to a gas outlet terminal 58 which is disposed at the center of the lower portion of the front panel 18 and from which the arc generating gas is supplied to the torch.

The power supply circuit can be controlled depending on various operation modes. For example, the DC current applied to flow between the torch and the workpiece is controlled into steady-state current having a constant value. The value of the steady-state current is set by a user. In some welders, in order to initiate arcing, arc-initiating current of a higher value than the steady-state current is applied to flow between the torch and the workpiece. The value of the arc-initiating current is also set by the user. In some cases, instead of DC current, pulse current is applied to flow between the torch and the workpiece. Such pulse current can be produced, for example, by converting the DC current from the second rectifying circuit into pulse current by a pulse current converter. The frequency of the pulse current, too, is set by the user.

A welder is operable in various operation modes. The user should select one from the operation modes, such as Stick (manual welding) mode, Lift Start TIG mode, High Frequency Start TIG mode, and MIG mode. Parameters of the power supply apparatus must be selected depending on the operation modes of the welder.

The setting of the values of current and the selection of operation modes are made by means of controls. The value of the steady-state current, the value of the arc-initiating current and the frequency of the pulse current can be set by means of, for example, rotary variable resistors 60, 62 and 64. The operation modes can be selected by means of switches 66.

The variable resistors 60, 62 and 64 and the switches 66 are mounted on a control printed circuit board 68. The control printed circuit board 68 includes part of control circuitry required for controlling the operation of the power supply apparatus by controlling, e.g. the current values and the frequency of the pulse current and selecting the operation modes stated above. The remaining part of the control circuitry is formed on another control printed circuit board 70 disposed under the printed circuit board 38. The control printed circuit boards 68 and 70 are interconnected by wiring 72.

The control printed circuit board 68 is mounted on the front panel 18. The front panel 18 has in its upper portion a generally rectangular window 74 through which the space within the housing 12 communicates with the exterior. The control printed circuit board 68 is secured to the inner surface of the front panel 18 to close the window 74 with the front surface of the control printed circuit board 68 facing the window 74.

Figure 4:
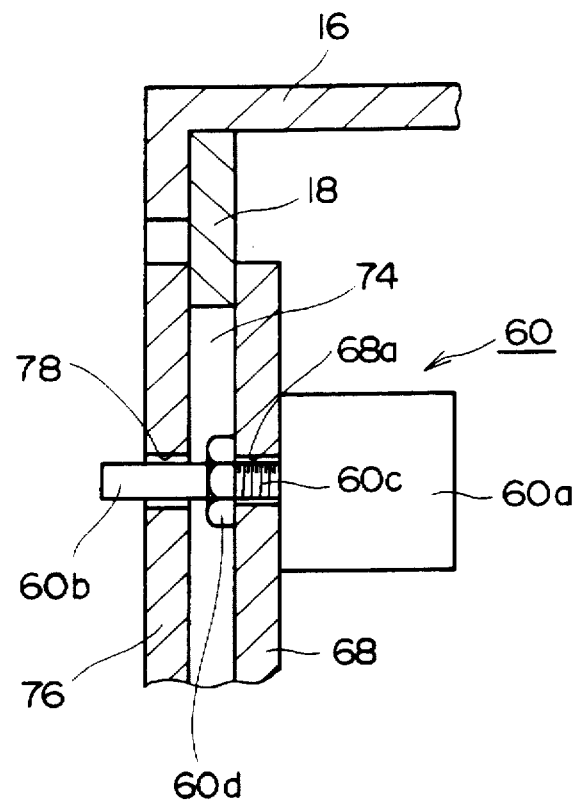
FIG. 4 is an enlarged cross-sectional view of part of the power supply apparatus of FIG. 3.

The rotary variable resistor 60, as shown in FIG. 4 which is an enlarged view of part of the apparatus shown in FIG. 3, has a main part 60a and a columnar operating member 60b projecting from the front surface of the main part 60a. The proximal portion of the operating member 60b is threaded to form a male thread 60c. The main part 60a of the rotary variable resistor 60 is disposed on the back side of the control printed circuit board 68, and the operating member 60b passes through a through-hole 68a formed in the control printed circuit board 68 and projects outward of the front surface of the control printed circuit board 68. The variable resistor 60 is secured to the control printed circuit board 68 with a nut 60d screwed onto the male thread 60c. The nut 60d is screwed on the male thread 60c within the boundary of the window 74, and does not project outward of the front surface of the front panel 18. The other variable resistors 62 and 64 and the switches 66 are mounted on the front panel 18 in the same manner as the variable resistor 60.

A decorative board 76 is secured to the front surface of the front panel 18 to close the window 74. The decorative board 76 includes through-holes 78 (FIG. 2) at locations corresponding to the respective locations of the variable resistors 60, 62 and 64 and the switches 66 on the printed circuit board 68. The operating members of the variable resistors 60, 62 and 64 and the switches 66 pass through the respective through-holes 78. The decorative board 76 covering the window 74 hides from view the portions of the control printed circuit board 68 where the variable resistor 60 and other components are mounted.

The variable resistor 60 and other components are mounted on the control printed circuit board 68 before the printed circuit board 68 is secured to the front panel 18. Then, the decorative board 76 is attached to the panel 18. Thus, the attachment of the control printed circuit board 68 to the front panel 18 results in the attachment of the variable resistor 60 and other components to the front panel 18, which can eliminate the connecting of the variable resistor 60 and other components by wiring to the control printed circuit board after their attachment to the panel.

The rear panel 20 includes in its upper portion a window 80. A board 82 for a power source is attached to the rear or outer surface of the rear panel 20 to close the window 80. On the board 82, a power source switch 84 and a cable 86 for introducing commercial AC power into the housing 12 are disposed.

Though the power supply apparatus of the described embodiment includes the separate control printed circuit boards 68 and 70 for different circuit components, the control printed circuit board 68 may carry all of the control circuit components thereon. In the described embodiment, the power supply apparatus according to the present invention is used for a welder, but it also may be used for a cutter. In the power supply apparatus used for the cutter, operation modes to be selected by switches include a mode in which the solenoid valve 56 is enabled to check the flow of the arc generating gas and an arcing self-sustaining mode in which arcing, once it is initiated, is continued even when an arc switch on the torch for initiating arcing is turned off.

What is claimed is:

1. Power supply apparatus comprising:

a housing having a panel;

a power supply disposed in said housing for providing DC power to a load; and a printed circuit board having a control unit mounted thereon, said control unit controlling the operation of the power supply in accordance with control information, said printed circuit board being attached directly to said panel within said housing, said printed circuit board having a control including a control operating member extending outward through said panel, said control providing said control information in response to operation of said control operating member outside said panel.

2. The power supply apparatus according to claim 1 wherein said panel has a window therein through which the interior of said housing communicates with the exterior, said printed circuit board being attached directly to the inner surface of said panel to close said window, said control being mounted directly on said printed circuit board.

3. The power supply apparatus according to claim 2 wherein a decorative board is attached directly to the outer surface of said panel to close said window, said control operating member passing through said decorative board.

* * * * *